(12) United States Patent
Ruelberg et al.

(10) Patent No.: US 11,010,913 B2
(45) Date of Patent: May 18, 2021

(54) DETERMINING THE GRAIN WEIGHT OF AN EAR

(71) Applicant: BASF Agro Trademarks GmbH, Ludwighafen am Rhein (DE)

(72) Inventors: Klaus Ruelberg, Cologne (DE); Gregor Fischer, Overath (DE)

(73) Assignee: BASF Agro Trademarks GmbH, Ludwighafen am Rhein (DE)

( * ) Notice: Subject to any disclaimer, the term of this patent is extended or adjusted under 35 U.S.C. 154(b) by 109 days.

(21) Appl. No.: 16/342,341

(22) PCT Filed: Oct. 12, 2017

(86) PCT No.: PCT/EP2017/076035
§ 371 (c)(1),
(2) Date: Apr. 16, 2019

(87) PCT Pub. No.: WO2018/073093
PCT Pub. Date: Apr. 26, 2018

(65) Prior Publication Data
US 2019/0236800 A1    Aug. 1, 2019

(30) Foreign Application Priority Data

Oct. 19, 2016  (EP) ..................................... 16194686
Oct. 19, 2016  (EP) ..................................... 16194687

(51) Int. Cl.
*G06T 7/60*        (2017.01)
*G06K 9/00*        (2006.01)
(Continued)

(52) U.S. Cl.
CPC ............ *G06T 7/60* (2013.01); *G06K 9/00657* (2013.01); *G06K 9/6202* (2013.01); *G06Q 50/02* (2013.01);
(Continued)

(58) Field of Classification Search
CPC .. G06T 7/60; G06T 7/194; G06T 7/90; G06T 7/62; G06T 2207/10004;
(Continued)

(56) References Cited

U.S. PATENT DOCUMENTS

2014/0176705 A1    6/2014  Ibamoto
2016/0223507 A1    8/2016  Li et al.
(Continued)

FOREIGN PATENT DOCUMENTS

CN    101944231 A    1/2011
CN    103632157 A    3/2014
(Continued)

OTHER PUBLICATIONS

"Image segmentation", Wikipedia, retrieved on Jul. 9, 2019, XP055422415, 16 pages, (URL: https://en.wikipedia.org/wiki/Image_segmentation).
(Continued)

*Primary Examiner* — Christopher Wait
(74) *Attorney, Agent, or Firm* — Lowenstein Sandler LLP

(57) ABSTRACT

A method is presented for determining a weight of all of the grains of an ear of a grain stalk. The method comprises providing a digital image of the ear in a spindle step view of the ear, wherein the ear is located in front of a reference card as a background, and determining the length of the ear by means of a comparison with the reference card. Furthermore, the method comprises determining a number of spindle steps of the ear by means of a template matching method, determining a number of grains of the ear and determining of the weight of all of the grains of the ear.

16 Claims, 9 Drawing Sheets

(51) Int. Cl.
  *G06Q 50/02* (2012.01)
  *G06T 7/194* (2017.01)
  *G06T 7/90* (2017.01)
  *G06K 9/62* (2006.01)
  *G06T 7/62* (2017.01)

(52) U.S. Cl.
  CPC ............... *G06T 7/194* (2017.01); *G06T 7/90* (2017.01); *G06T 7/62* (2017.01); *G06T 2207/10004* (2013.01); *G06T 2207/10024* (2013.01); *G06T 2207/30188* (2013.01)

(58) Field of Classification Search
  CPC ........... G06T 2207/10024; G06T 2207/30188; G06K 9/00657; G06K 9/6202; G06Q 50/02
  See application file for complete search history.

(56) References Cited

U.S. PATENT DOCUMENTS

2016/0225135 A1* 8/2016 Young .................. G06T 7/90
2016/0283791 A1 9/2016 Ogura et al.

FOREIGN PATENT DOCUMENTS

EP 2752807 A1 7/2014
EP 2752808 A1 7/2014

OTHER PUBLICATIONS

"Template matching", Wikipedia, retrieved on Jul. 9, 2019, XP055420656, 4 pages, (URL: https://en.wikipedia.org/wiki/Template_matching).
Du, et al., "Three-Dimensional Reconstruction and Characteristics Computation of Corn Ears Based on Machine Vision", International Conference on Computer and Computing Technologies in Agriculture, CCTA 2013: Computer and Computing Technologies in Agriculture VII, 2014, pp. 290-300.
Guérin, D., "Feasibility study of a wheatears counting vision system", Proceedings of the Complex Systems Intelligence and Modern Technology Applications, 2004, pp. 658-664.
Kenneth Dawson-Howe, "A Practical Introduction to Computer Vision with OpenCV", Wiley-IS&T Series in Imaging Science and Technology, May 12, 2014, 234 pages.
PIXELFUSION3D, "Measuring Ear of Wheat", Mar. 27, 2016, Photo ID: 516684148, XP055421928, (URL: https://www.istockphoto.com/fi/photo/measuring-ear-of-wheat-gm516684148-89099059).
Susan McGinley, "Regulation of Early Endosperm Development in Maize", Agricultural Experiment Station Research Report, The University of Arizona, Nov. 13, 2009, 3 pages.
Wizthings, "Photographic Scale ASC 2", Mar. 17, 2014, Model No. PS-ASC2-001, ASIN B00J2ABBBQ, XP055421923, (URL: https://www.amazon.co.uk/Wizthings-Photographic-Scale-ASC-2/dp/B00J2ABBBQ/).
Zambanini, et al., "Chaper 11—An Automatic Method to Determinethe Diameter of Historical Coins in Images", Scientific Computing and Cultural Heritage: Contributions in Computational Humanities (Contributions in Mathematical and Computational Sciences), ed. Bock, et al., 2012, pp. 99-106.
U.S. Appl. No. 16/342,363, filed Apr. 16, 2019.
"Local binary patterns", Wikipedia, retrieved on Jul. 16, 2019, 4 pages. (URL:https://en.wikipedia.org/wiki/Local_binary_patterns).
Selfie stick, Wikipedia, retrieved on Jul. 16, 2019, 6 pages. (URL: https://en.wikipedia.org/wiki/Selfie_stick).
Bakhouche, et al., "Texture analysis with statistical methods for wheat ear extraction", Proceedings SPIE 6356, Eighth International Conference on Quality Control by Artificial Vision, May 23, 2007, 8 pages.
Cointault, et al., "Improvements of image processing for wheat ear counting", International Conference on Agricultural Engineering & Industry Exhibition, Jun. 25, 2008, 11 pages.
Cointault, et al., "In-field Triticum aestivum ear counting using colour-texture image analysis", New Zealand Journal of Crop and Horticultural Science, vol. 36, Issue 2, 2008, pp. 117-130.
European Search Report for EP Patent Application No. 16194687.6, dated Apr. 11, 2017, 3 pages.
Frederic, et al., "Texture, Color and Frequential Proxy-Detection Image Processing for Crop Characterization in a Context of Precision Agriculture", Agricultural Science, ed. Dr. Godwin Aflakpui, Apr. 2012, pp. 49-70.
Guérin, et al., "Feasibility study of a wheatears counting vision system", CSIMTA: Proceedings of the Complex systems, Intelligence and Modern Technology applications, Sep. 22, 2004, pp. 658-664.
He, et al., "Texture Unit, Texture Spectrum. and texture Analysis", IEEE Transactions on Geoscience and Remote Sensing, vol. 28, Issue 4, Jul. 1990, pp. 509-512.
Jones, et al., "Remote Sensing of Vegetation: Principles, Techniques, and Applications", Oxford University Press, U.S.A, Sep. 10, 2010, p. 92, pp. 94-95, 99-100, 104-105, 283-287.
Journaux, et al., "Fourier Filtering for Wheat Detection in a Context of Yield Prediction", XVIIth World Congress of the International Commission of Agricultural and Biosystems Engineering (CIGR), Jun. 13-17, 2010, 9 pages.
Kim, et al., "Automatic spike detection based on adaptive template matching for extracellular neural recordings", Journal of Neuroscience Methods, vol. 165, Issue 2, Sep. 30, 2007, pp. 165-174.
Petr, et al., "Yield formation in the main field crops", Elsevier, 1988, pp. 151-153.
Topi, et al., "Texture classification by multi-predicate local binary pattern operators", Proceedings 15th International Conference on Pattern Recognition. ICPR-2000, Sep. 3-7, 2000, pp. 951-954.
International Search Report for PCT/EP2017/076035 dated Nov. 23, 2017.
International Search Report for PCT/EP2017/076320 dated Oct. 16, 2017.
Written Opinion of the International Searching Authority for PCT/EP2017/076035 dated Nov. 23, 2017.
Written Opinion of the International Searching Authority for PCT/EP2017/076320 dated Oct. 16, 2017.

* cited by examiner

DETERMINING THE GRAIN WEIGHT OF AN EAR

CROSS-REFERENCE TO RELATED APPLICATIONS

This application is a national stage application (under 35 U.S.C. § 371) of PCT/EP2017/076035, filed Oct. 12, 2017, which claims benefit of European Application Nos. 16194686.8 and 16194687.6, both filed Oct. 19, 2016, all of which are incorporated herein by reference in their entirety.

The invention generally relates to a prediction of the yield of a harvest and in particular to determining a weight of all of the grains of an ear of a grain stalk in a cornfield. The invention further relates to a system for determining a weight of all of the grains of an ear of a grain stalk and to a computer system relating thereto.

Now that automation of classic production areas in industrial manufacturing is well advanced, this trend is now continuing in the classic agricultural field. Although the use of monitoring technology is not yet the universal standard in agricultural production processes, there is progress in this area as well. In many cases, classic industry 4.0 technologies can also be applied to agricultural processes and machines. In this case, however, at least one factor must be taken into consideration: the selected technologies should be easy to manage and robust. Moreover, the technologies used must be economical, as price pressure is also continuously mounting in production plants due to globalization.

Now and then, on the other hand, there are still reservations with respect to the use of high technology on farms, as dealing with these technologies is not part of standard knowledge in this field. Accordingly, information technology to be used in agricultural businesses must allow simple and intuitive operation.

Depending on the country, there are indeed several regions of the world in which highly sophisticated smart farming or digital farming initiatives are already in place, some of which have also achieved a high degree of automation in field work; with relatively little expense, however, it is possible to achieve considerable improvements if analysis techniques supported by image processing and information technology are made available in simple form and on a broad scale. This can be implemented most favorably in the form of technologies that have already penetrated into the daily life of the population.

Few quantitative parameters have been used to date in predicting yields in agriculture—in particular in predicting yields of cornfields. In most cases, these are still empirical values. In addition to reliable weather data, further analysis techniques would also be helpful in allowing famers to make highly precise predictions with respect to their crop yields in order to decide the best time for harvesting. In this way, it would be possible for producers to take advantage of customer purchase price fluctuations—such as e.g. those of agricultural cooperatives or industrial bulk purchasers—in order to optimize profits.

Accordingly, there is a need for improved yield prediction in cornfields and other agriculturally used surfaces. The subject matter of the present document addresses this objective.

The object of this application is achieved by means of the subject matter of the independent claims. Further examples are found in the dependent claims, the present description and in the figures.

A first subject matter of the present invention is thus a method for determining a weight of all of the grains of an ear of a grain stalk, wherein the method comprises
   providing a digital image of the ear in a spindle step view of the ear, wherein the ear, in capturing of the digital image, is located in front of a reference card as a background,
   determining a length of the ear along the longitudinal axis of the ear by separating image pixels of the digital image of the ear from the background and comparing pixel coordinates at one end of the ear with pixel coordinates of the ear at an opposite end of the ear in a longitudinal direction of the ear by means of image marks on the reference card,
   determining a number of spindle steps of the ear by means of a template matching method,
   determining a number of grains of the ear by multiplying the determined number of spindle steps by a factor, and
   determining the weight of all of the grains of the ear by multiplying the determined number of grains by a calibration factor.

A further subject matter of the present invention is a computer program product comprising a computer-readable storage medium in which program elements for determining a weight of all of the grains of an ear of a grain stalk are stored which, when they are executed by a processor, cause the processor to carry out the method according to the invention.

A further subject matter of the present invention is a system for determining a weight of all of the grains of an ear of a grain stalk, wherein the system comprises
   a receiving unit for receiving a digital image of the ear in a spindle step view of the ear, wherein the ear in the digital image is located in front of a reference card as a background,
   a measuring unit that is adapted for determining a length of the ear along the longitudinal axis of the ear by separating image pixels of the digital image of the ear from the background and comparing pixel coordinates at one end of the ear with pixel coordinates of the ear at an opposite end of the ear in a longitudinal direction of the ear by means of image marks on the reference card,
   a spindle step calculation unit that is adapted for determining a number of spindle steps of the ear by means of a template matching method,
   a grain number determination unit that is adapted for determining a number of grains of the ear by multiplying the determined number of spindle steps by a factor, and
   a weight determination unit that is adapted for determining the weight of all of the grains of the ear by multiplying the determined number of grains by a calibration factor.

According to a first aspect of the present invention, a method is provided for determining a weight of all of the grains of an ear of a grain stalk. The method comprises the providing of a digital image of the ear in a spindle step view of the ear, wherein the ear in the digital image is depicted in front of a reference card as a background.

The method further comprises determining a length of the ear along the longitudinal axis of the ear by separating image pixels of the digital image of the ear from the background and comparing pixel coordinates at one end of the ear with pixel coordinates of the ear at an opposite end of the ear in a longitudinal direction of the ear by means of image marks on the reference card.

Moreover, the method comprises determining a number of spindle steps of the ear by means of a template matching method, determining a number of grains of the ear by multiplying the determined number of spindle steps by a factor, and determining the weight of all of the grains of the ear by multiplying the determined number of grains by a calibration factor.

According to a further aspect of the invention, a system for determining a weight of all of the grains of an ear of a grain stalk is provided. The system comprises a receiving unit for receiving a digital image of the ear in a spindle step view of the ear, wherein the ear in the digital image is located in front of a reference card as a background.

The system further comprises a measuring unit that is adapted for determining a length of the ear along the longitudinal axis of the ear by separating image pixels of the digital image of the ear from the background. Furthermore, the measuring unit is adapted for comparing pixel coordinates at one end of the ear with pixel coordinates of the ear at an opposite end of the ear in a longitudinal direction of the ear by means of image marks on the reference card.

Additionally, the system comprises:
a spindle step calculation unit configured such that it determines a number of spindle steps of the ear by means of a template matching method,
a grain number determination unit configured such that it determines a number of grains of the ear by multiplying the determined number of spindle steps by a factor, and
a weight determination unit configured such that it determines the weight of all of the grains of the ear by multiplying the determined number of grains by a calibration factor.

It should be noted that the system presented can be implemented as part of a smartphone. Moreover, by means of a high-performance form of a smartphone, the method presented here can also be completely or partially carried out by said smartphone. Alternatively, determining the total number of grains of an ear can also be carried out on a dedicated computer specially adapted for this purpose, a server computer or any other computer system.

For this purpose, it can be necessary for embodiments to be in the form of a corresponding computer program product. This product can comprise instructions which, when executed on a computer system, carry out steps of the method described.

The method presented for determining a weight of all of the grains of an ear of a grain stalk and the corresponding system have a series of advantages and technical effects:

As a front end, items in everyday use—such as smartphones—can be used to improve yield prediction. The use of a mobile device—such as a mobile telephone with a camera—is sufficient to allow farmers to make an improved yield prediction of their cornfield. For this purpose, it can be important as a point of departure to determine the yield potential of an ear of a cornfield. Only one or two digital images of an ear are sufficient to allow the farmer to make a significantly improved prediction of the yield of a field. The use of a further everyday item in the form of a reference card does not make the management or acceptance of the method more complex.

In this process, the ear can either be picked or cut off and placed on the reference card, or the ear can remain on the stalk and the reference card can simply be placed behind the ear. The scale on the reference card provides a clear and genuine measuring criterion together with the digital image.

The computing power required for automated measurement of the ear and the grain weight of the ear can be provided by a computer center. This computer center can be operated at any desired location. A computer can be used by a farmer, a plurality of farmers can operate the computer together, or a service provider can take over the analysis work and provide the required computing power. The latter possibility is further advantageous in that this service could be provided in the form of a cloud computing service for a large number of farmers in different regions or also in multiple countries. This would also make it easier to take into account parallels among different regions, global as well as local weather influences, or regionally known pest infestation, use of fertilizer, use of insecticides, etc.

For this purpose, the digital image can be transmitted via a mobile network to an evaluation computer. The analysis can be carried out, and the result can be wirelessly transmitted back to the farmer or the mobile device. Using conventional methods, one could extrapolate from the grain weight of an ear to the entire field.

In a further improved form, and together with a high-performance computer system in the mobile device, the analysis could also be carried out directly on site. The required calculation algorithms could be made available in the form of a smartphone app. Alternatively, a dedicated calculating unit (a special processor or special hardware) can be attached to the mobile device or integrated into the mobile device.

Furthermore, it is not absolutely necessary—but is advantageous—to use a smartphone for the digital image. The farmer could also use a conventional digital camera and transmit the digital image of the ear in a different form to the computer for analysis, for example by means of wired communication technologies or relay stations that use known communication routes such as WLAN, Bluetooth or other comparable communication means.

Determination of the natural, non-constant spindle steps of the ear and multiplication of the determined number of spindle steps by an average factor of grains per spindle step allows elegant determination of the number of grains per ear. This provides a basis for estimating the field yield.

By means of the type of digital images of the ear in the form of the spindle step view—the matching method used for determining the number of spindle steps provides a good basis for the further processing and determination steps.

In the following, further embodiments of the suggested method for determining a weight of all of the grains of an ear of a grain stalk will be described.

Accordingly to an example, the method also comprises determining a 1000 grain weight of the grains of the ear. This value—also referred to as thousand grain weight (TGW)—is a common calculation value for estimating yields in an agricultural environment and indicates the weight of 1000 grains of a grain batch. It can be calculated from the grain weight of an ear and the determined number of grains of the ear.

According to an advantageous embodiment of the method, the template matching method can comprise pixel-wise displacement of a selected image template composed of an average partial area of the ear over the entire ear in a longitudinal direction of the ear. Additionally, the method can comprise respective determination of a respective similarity factor of the image template with a respective covered ear section in each displacement position. This allows regular relative maxima to occur with respect to the similarity factor of an x-y representation. In the representation, the x direction of the representation can be the pixel number or position, and in the y direction, one can plot a similarity value of the respective ear section with the template.

The selected partial area of the ear can take up approx. 15-25% of the ear in an average area of the ear. Additionally, this embodiment can comprise determining the number of spindles from the x-y representation. As the template matching method is a known method from the field of image processing, conventional program library functions and modules can be used. Use of this matching method provides favorable accuracy and robustness against fluctuations in illumination geometry during determination of the spindle steps. This is advantageous because the number of spindle steps has a decisive effect on the number of grains of the ear. An additional spindle step of the ear can be synonymous with 4 additional grains, which can increase the total number of grains of the ear by up to 10%. Accordingly, the most accurate detection possible of the number of spindle steps can be synonymous with the accuracy of the suggested method.

According to an additional special embodiment, determining the number of spindles from the x-y representation in the method can comprise determining the number of relative maxima of a similarity value by means of simple counting. This procedure requires little computing power, but is not the most accurate compared to other methods, because the degree of similarity decreases toward the ends of the ear and the maxima are therefore not as pronounced as in the central ear area.

According to a further embodiment, determining the number of spindles from the x-y representation in the method can comprise determining an average period length from the distances of the relative maxima of a similarity value from one another and determining the number of spindles by dividing the ear length by the period length.

In contrast to the above-described embodiment, the current described embodiment can show a higher degree of accuracy in determining the number of spindle steps. The reason is that the relative maxima in the x-y representation can be more sharply pronounced than in the previous embodiment. This results in higher accuracy in determining the number of spindle steps of an ear.

According to an advantageous embodiment, the method for determining the length of the ear can comprise transformation of the position of the pixels of the ear relative to the reference card, so that oblique perspectives of the digital image of the ear can be compensated for, and so that the longitudinal axis of the ear can lie parallel to one side of the reference card. This allows more accurate detection of the length of the ear. Moreover, such a transformation can completely or partially compensate for distortions due to oblique images of the ear.

According to an additional advantageous embodiment, the method for determining the length of the ear can comprise placing the ear upright according to a transformation of the pixels of the ear relative to the reference card, so that the longitudinal axis of the ear can lie parallel to the side of the reference card. Placing the ear upright can be understood as a certain "straightening" of the ear so that a central axis of the ear can be oriented essentially parallel to side edges that lie parallel to each other. For this purpose, the image section can be taken with the identified ear object and subjected to a morphological image operation. This procedure has the advantage of providing better conditions for the template matching method, as curvature of the ear no longer has to be taken into consideration in the matching method.

According to a further advantageous embodiment, a development stage of the ear can be greater than or equal to 60 according to the BBCH code. In an earlier development stage of the ear, major inaccuracies can occur in determining the grain weight of an ear. Experience has shown that from a development stage of greater than 60 according to the BBCH code on, good accuracy can be achieved in determining the grain weight.

According to an additional example of the method, a color value of the reference card can be in sharp contrast to an average color value of the ear, e.g. in an RGB color model. The person having ordinary skill in the art understands that another color model can also be selected, because color models can generally be converted into one another by means of simple transformation. The contrasting color value suggested here can for example be a complementary color of an essential color component of the ear. A blue or greenish blue color has been found to be advantageous, in this way, easy differentiation of pixels of the background and pixels of the ear located in front of the background can become possible.

According to a further embodiment of the method, the spindle step view can be that view of the ear that provides the smallest view area when a longitudinal axis of the ear runs vertically. The spindle step view is thus a view of the ear that constitutes a flower view rotated by 90° around the longitudinal axis of the ear. In this way, the reproducibility of the method can be facilitated.

A further advantageous embodiment of the method can allow capturing of the digital image of the ear to be carried out on the stalk of the ear or separately from the stalk. In this manner, it is not necessary for the ear to be cut off or torn off before capturing a digital representation of the ear. Digital capturing of the ear together with the reference card can be carried out in each position. It would be advantageous if a middle plane parallel to the longitudinal axis of the ear ran parallel to the surface of the reference card.

According to a further advantageous embodiment of the method, the image marks of the reference card can comprise at least two image markers. The image markers can comprise at least one scale. For example, the two image markers can be formed by image-corner markers. In this way, the corners of the reference card can be identified in an elegant manner by means of image processing methods.

In further advantageous examples, the calibration factor can have at least one dependency with respect to one of the following factors: type of ear, growth stage of ear, weather (long-term and short-term), geographic location and fertilization status. Further influencing parameters can be taken into consideration at any time.

Moreover, embodiments can take the form of an assigned computer program product that can be accessed from a computer-usable or computer-readable medium. The instructions can cause a computer—such as e.g. a smartphone, a server or a combination of the two—to execute processing steps according to the method presented. For the purpose of this description, the computer-usable or computer-readable medium can be any apparatus comprising elements for storage, communication, transport or transmission of the program together with the instruction-processing system.

BRIEF DESCRIPTION OF VARIOUS VIEWS OF THE FIGURES

It should be noted that aspects of the invention are described in the context of various types of examples. Some examples are described with respect to process claims, while other examples are described in the context of device-type claims, Nevertheless, the person having ordinary skill in the art will be able to understand from the above and following descriptions—unless a deviation therefrom has been indicated that not only can features of a claim genre be combined with one another, they can also constitute a combination of features that exceeds the scope of the claim type.

The aspects and further aspects of the present invention presented above are derived from the examples and figures, which are described in further detail below.

These examples serve as possible implementation forms, without being limited thereto, and they refer to the following figures.

In the context of this description, the following conventions, terms and/or expressions are used:

The term "grain stalk" or "ear of a grain stalk" requires no further interpretation. This can be an ordinary cereal plant that grows in an agricultural field. Typically, the grain can be wheat, rye or barley.

The term "digital image" describes a digital representation of an actual scene that can typically be taken by means of a digital camera. The digital image or the digital picture can be composed of pixels having differing color values and thus produce a graphical overall impression.

The term "flower view of the ear" describes a view of the ear in which the grains are clearly visible. The flower view can also be referred to as a grain view of the ear, because the grains of the ear are the most clearly visible in this view. In this view, the awns predominantly extend to the left and right respectively away from the ear. In this view, the view area of the ear is the largest. In contrast to the flower view, the term "spindle step view" describes a view of the ear rotated by 90°, i.e. a view of the narrow portion of the ear. In this case, one is therefore looking at the narrower side of the ear or at the awns of the ear if the longitudinal axis of the ear runs vertically.

In the context of this description, a "reference card" is a flat object—for example a card having a single color—the color value of which differs sharply from that of the ear. A color that is complementary to a typical color value of the ear—e.g. blue—has been found to be advantageous.

The term "template matching method" is known to the person having ordinary skill in the art as a method for determining the structure of a digitally represented object. A more detailed description can be found for example in S. Kim, J. McNames, "*Automatic spike detection based on adaptive template matching for extracellular neural recordings*," Journal of Neuroscience Methods 165, pp. 165-174, 2007.

The term "development stage" or "development step" describes a stage in the natural life cycle of a plant—here a grain—from sowing until harvest. It has been found that using the "BBCH Code" for describing the development stage of a plant is helpful. The abbreviation "BBCH" officially stands for "Biologische Bundesanstalt, Bundessortenamt and Chemische Industrie [Federal Biological Research Centre, Federal Plant Variety Office, and Chemical Industry]" and describes a phenological development stage of plants. The code begins with 00 and ends with 89. For example, a BBCH code of between 10 and 19 describes an early development stage of a leaf. Beginning with a BBCH code of 60, the flower of the plant appears (up to 69). The next 10 steps respectively describe the fruit development (70-79), ripening of the seed (80-89) and death (90-99—for annual plants) of the plant.

Figure 1:
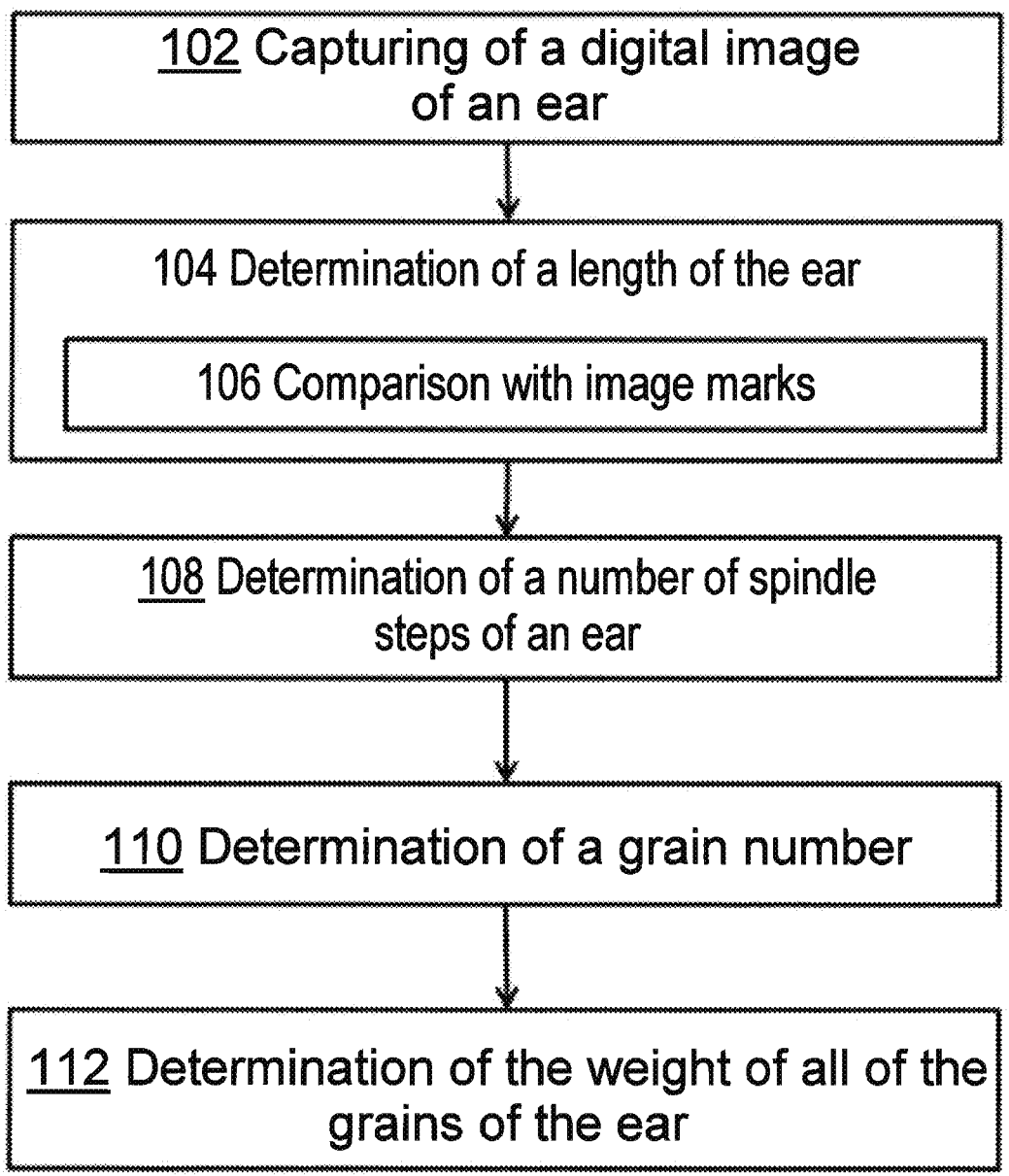
FIG. 1 shows a block diagram of an embodiment of the method according to the invention for determining the total number of grains of an ear of a grain stalk.

FIG. 1 shows a block diagram of an example of the method according to the invention 100 for determining the total number of grains of an ear of a grain stalk. The method first comprises the provision 102 of a digital image of the ear in a spindle step view of the ear. The ear, in capturing of the digital image, should be located in front of a reference card as a background. For practical reasons, the reference card is preferably a color that is complementary (e.g. blue) to a typical color of an ear of corn (yellowish).

As a further step, the method comprises determination 104 of a length of the ear along the longitudinal axis of the ear by separating image pixels of the digital image of the ear from the background. This separation can be advantageously carried out by means of a color histogram process. In this way, a coherent surface of the ear can be distinguished from the background of the reference card. Additionally, the method comprises in this step comparison 106 of pixel coordinates at one end of the ear with pixel coordinates of the ear at an opposite end of the ear in a longitudinal direction of the ear by means of image marks on the reference card. In this manner, by means of a scale located on the reference card, the length of the ear can easily be determined. For this purpose, it is necessary only to subtract the corresponding y coordinates from each other.

It is advantageous if the image of the ear is subjected prior to determination of its length to a transformation that compensates for perspective distortions and oblique positions.

After this, determination 108 in the method of a number of spindle steps of the ear by means of a template matching method can be carried out, followed by determining a number of grains of the ear (step 110) by multiplying the determined number of spindle steps by a factor that indicates the number of grains per spindle step and for example has a value of 4.

In a final step of the method, determination 112 is carried out of the weight of all of the grains of the ear by multiplying the determined number of grains by a calibration factor. The calibration factor can take into account numerous variable influencing parameters. By continuously comparing the grain weights determined by the method with the grain weights determined by weighing out, a continuous and machine-supported learning process can be implemented within the method.

Moreover, an alternative form of the method 100 for determining the total number of grains of an ear of a grain stalk should be pointed out here: according to this embodiment as well, the process begins with preparation of a digital image of the ear. In this case, an image of the ear in the flower view—i.e, the view in which the grains of the ear are clearly visible—is captured in front of a reference card. This is followed by determining an area of the flower view of the car by separating image pixels of the digital image of the ear from the background, e.g. by means of a color histogram process, and comparing the area taken up by the ear by means of image marks on the reference card. The image marks can be the scale of the reference card or constitute the known distances of other image marks on the reference card. After this, the weight of all of the grains of the ear is determined by multiplying the determined area of the ear by a calibration factor. It has been found that there is a pronounced direct correlation between the projection area of the ear in flower view and the number of grains of the ear. This phenomenon is used here in order to simply and elegantly determine the grain weight of the ear. This alternative method can also be used quite favorably beginning with a growth stage that is greater than 60 BBHC. However, it also works at a lower BBHC.

Figure 2:
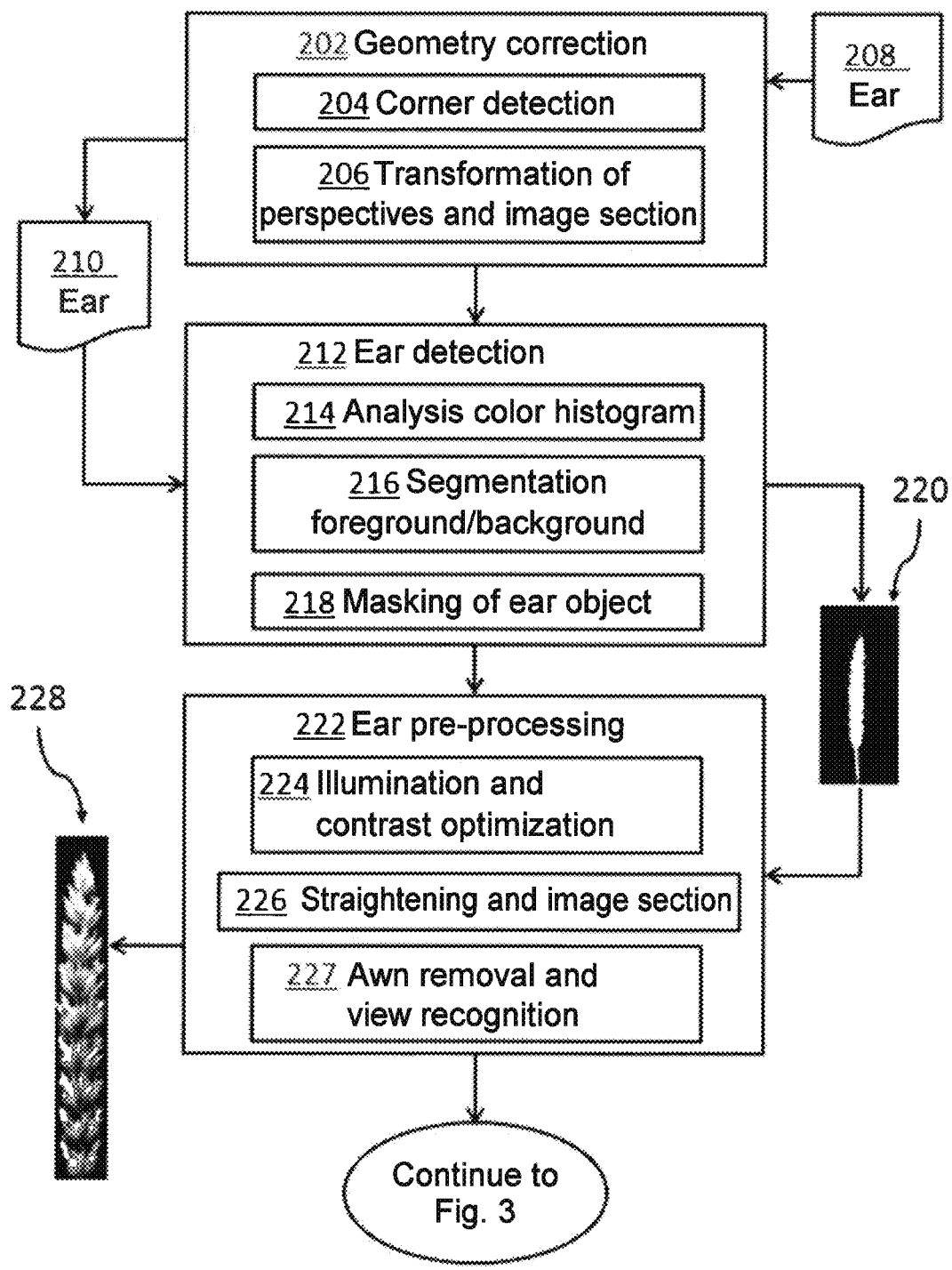
FIG. 2 shows a first part of a block diagram of an embodiment of the proposed method that is closer to implementation.

FIG. 2 shows a first part of a block diagram of an embodiment of the suggested method that is closer to implementation. A digital image 208 of an ear is first received together with a reference card. A geometry correction 202 also includes a corner detection 204 of the corners of a colored area on the reference card. After this, transformation 206 of the perspectives and image section is carried out so that areas outside the colored background with the ear lying thereon are ignored.

The image section 210 obtained in this manner is passed on by an ear detection function 212. The actual ear detection takes place by means of analysis 214 by a color histogram process in order to differentiate pixels of the ear and the colored background from one another (foreground/background segmentation 216). After this, the recognized ear object is masked 218. In this masked representation, recognized image pixels of the background can be represented as a logical "0." The result 220 is a representation of the ear separated from the background.

In a subsequent processing block, ear preprocessing 222 is carried out. This can comprise a step of illumination and contrast optimization 224. Next, transformational straightening of the ear and further reduction of the image section to be processed can be carried out (step 226). Optional awn removal makes it possible to recognize the view of the ear (step 227). Ideally, the view of the ear is a spindle step view. The further processing of the result 228 of the ear preprocessing takes place based on FIG. 3.

Figure 3:
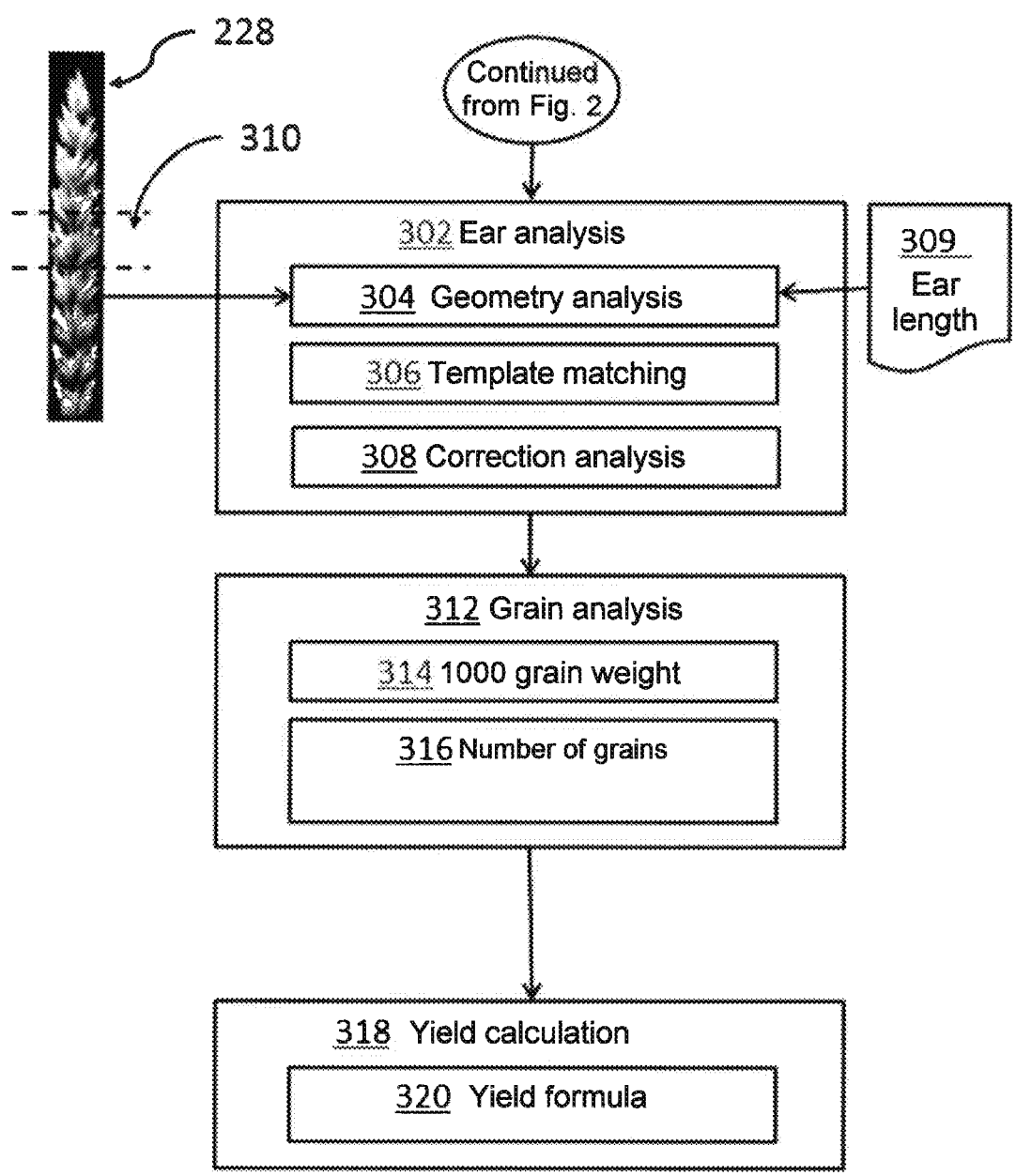
FIG. 3 shows a second part of the block diagram of the embodiment of the suggested method that is closer to implementation of FIG. 2.
Figure 5:
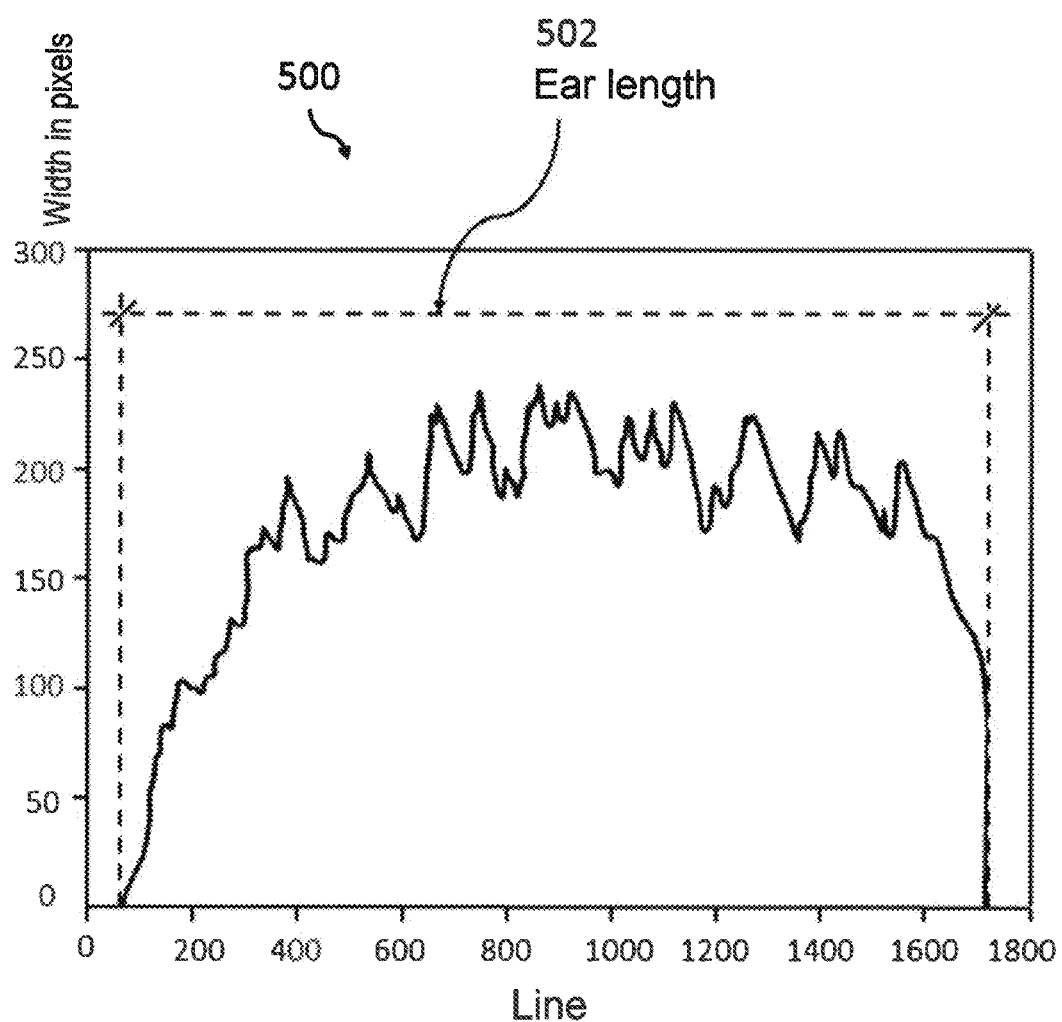
FIG. 5 shows an illustrative diagram for determining the ear length.

FIG. 3 shows a second part of a block diagram of an embodiment of the suggested method that is closer to implementation. The actual ear analysis 302 takes place here. For this purpose, a geometry analysis 304 is first required, the result of which is determination of the ear length 309. A comparison of the uppermost pixels of the car with the depicted and recognized scale or the known size of the colored area of the reference card—optionally with the aid of corner marks—allows, in connection with the distance to the stalk base at the lower end of the stalk base at the lower end of the ear, determination of the length of the ear in the longitudinal direction, as shown in FIG. 5.

In the subsequent template matching method 306, a middle selected area 310 of the ear 228, in the form displayed at this time, is displaced pixelwise in a vertical direction along the vertical longitudinal axis of the ear 228 above the ear. A respective similarity factor is determined that is mathematically determined by the cross correlation function 308 between the template and image function.

Figure 6:
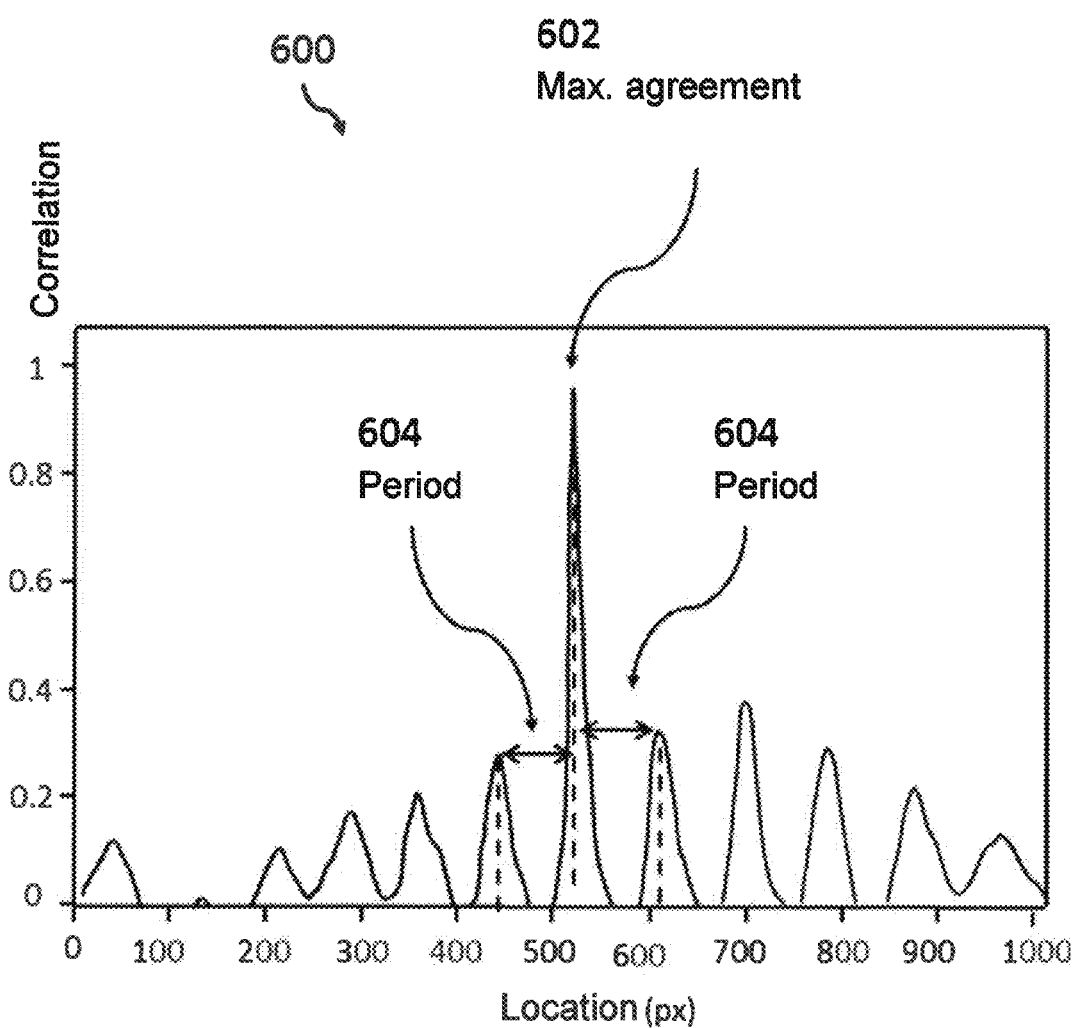
FIG. 6 shows an illustrative diagram of a cross correlation function for determining the number of spindle steps.

Because of the periodic pattern of the ear structure, pronounced maxima values arise in the course of the cross correlation function 308 that lie at a periodic distance from one another. A result of such a correlation analysis 308 is shown in FIG. 6, which yields the period length and thus the distance of the spindle steps from one another. The ratio of ear length 309 to period length provides an accurate measurement of half of the number of spindle steps, because the periodicity of the spindle steps is extremely clear and pronounced, with unvarying distance.

After this, on the basis established in this manner, the grain analysis 312 is carried out, with determination of the number of grains 316 and the 1000-grain weight 314. Additionally, this can be followed by yield calculation 318 for the entire field, or a partial area thereof, by means of a yield formula 320.

Figure 4:
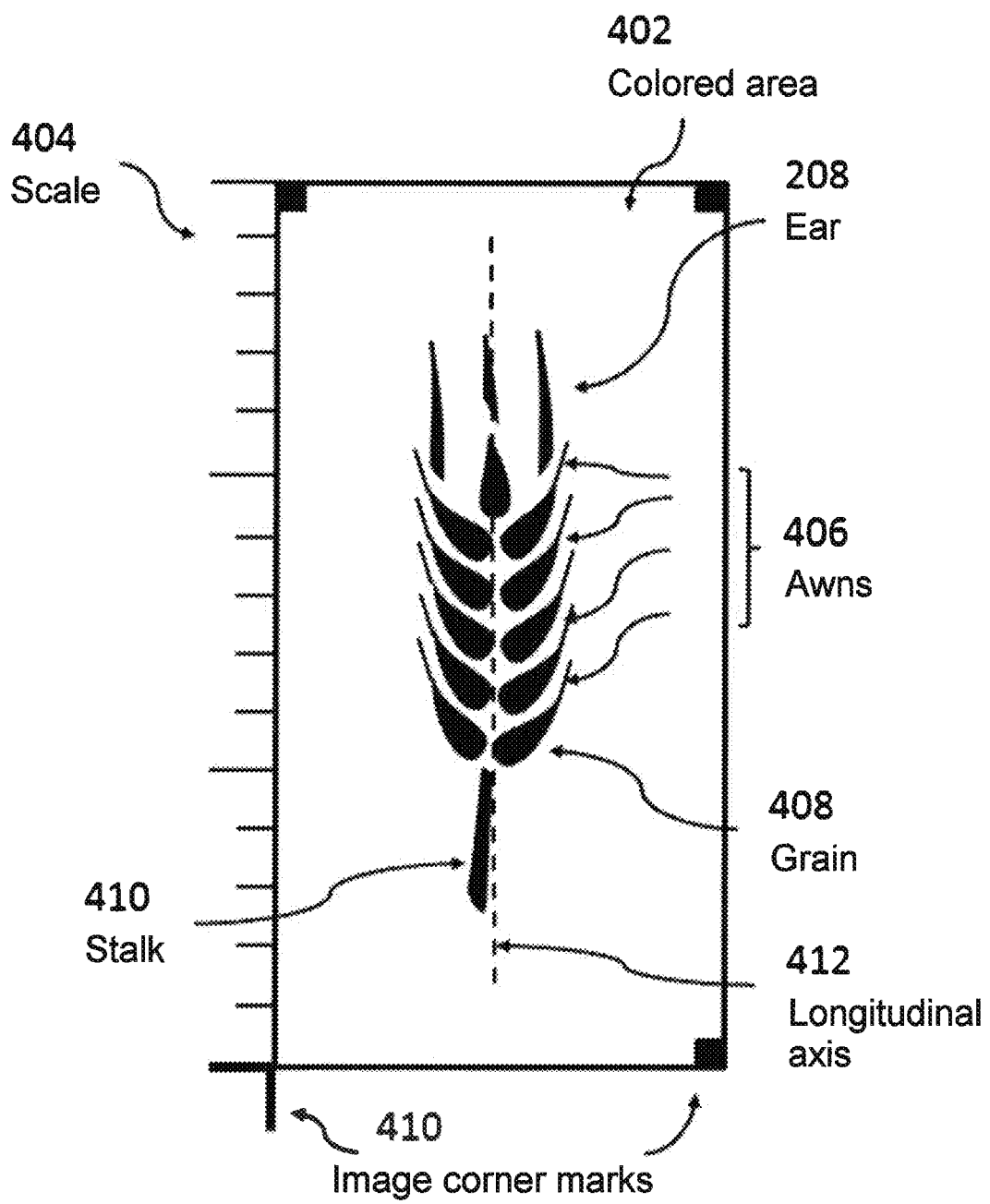
FIG. 4 shows an abstract representation of an ear and an example of a reference card together with an ear lying thereon.

FIG. 4 shows an abstract representation of an ear 208 and an example of a colored area 402 of a reference card (that can be larger than the area 402; color not shown) together with the ear 208 lying thereon. The colored area 402 comprises image marks such as a scale 404, and for example image corner marks 414. The image corner marks 414 can have various characteristics.

As extensions of the grain 408, awns 406 are symbolically shown that can be of varying length depending on the type of grain. Moreover, another piece of the stalk 410 is shown, which is important in the method presented only for recognition of the lower ear. The view shown here—for reasons of simplicity—is the flower view of the ear. The spindle step view, in which the actual digital imaging of the ear takes place, is a view rotated by 90° about the longitudinal axis of the ear.

The ear 208 should be oriented on the colored area 402 of the reference card in such a way that the longitudinal axis 412 of the ear 208 is oriented as close to parallel as possible to a side line of the colored area 402. A typical curved form of the ear 208 can be adapted by transformation of the representation of the ear 208 such that the longitudinal axis of the ear is actually oriented parallel to a side line of the colored area 402 of the reference card. The reference card is typically slightly larger than the colored area 402 contained thereon, the color of which is e.g. blue.

Of course, an actual image of an ear 208 represents a coherent area (for example as shown in FIG. 2, 220, 228). The type of representation of an ear 208 here is to be understood merely as a representation of the orientation of the ear 208 with respect to the reference card.

Figure 4A:
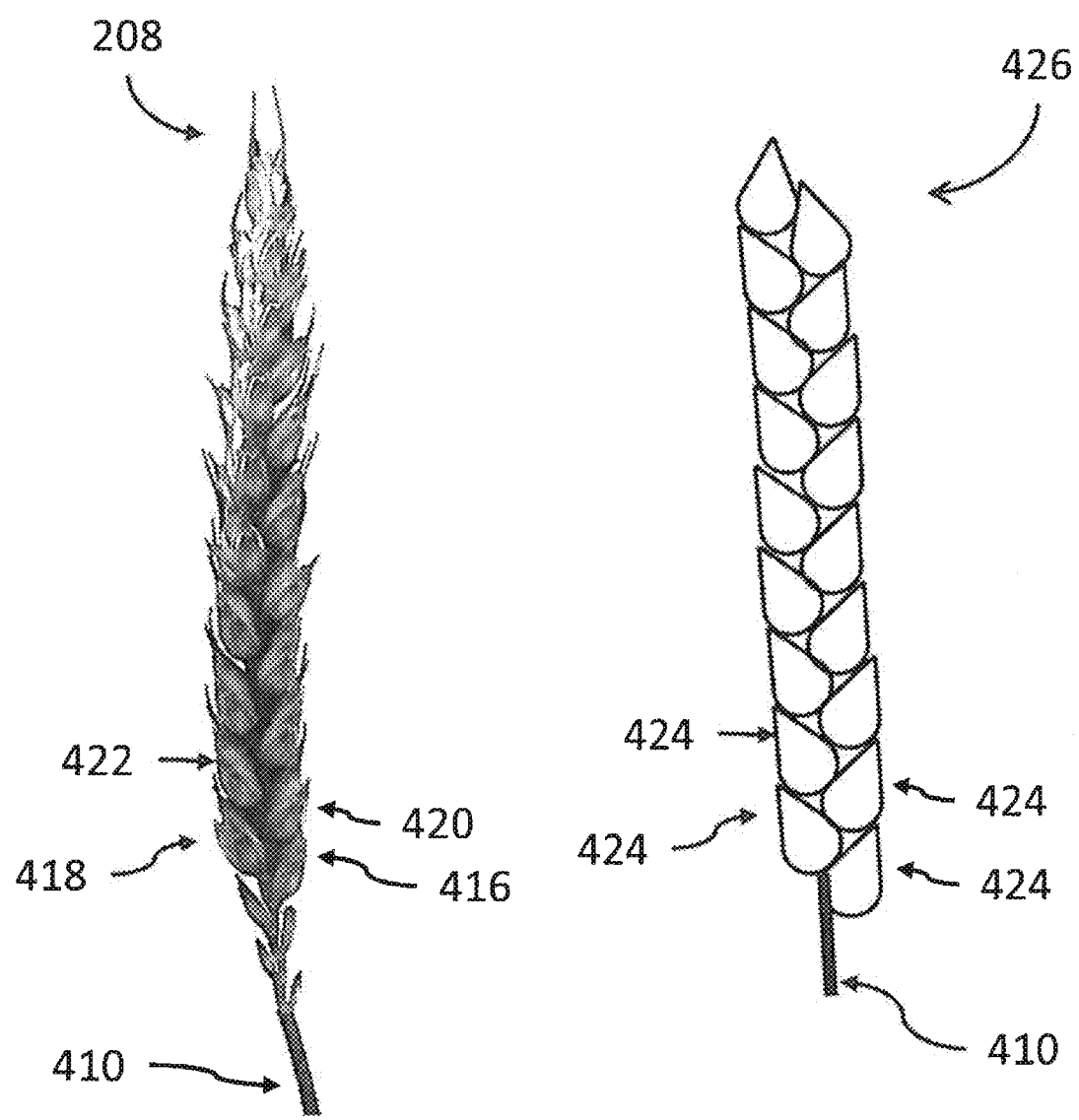
FIG. 4a shows a diagram of an ear and a view of the spindle steps of an ear.

FIG. 4a shows a diagram of an ear 208 (left) and a view 426 of the spindle steps of an ear (right). The image of the ear 208 clearly shows the different grains 416, 418, 420, 422 in the lower area of the ear and the stalk 410. Accordingly, the different spindle steps 424 of the ear 208 can be recognized in the more abstract form of the ear on the right side of FIG. 4a.

FIG. 5 shows an illustrative diagram 500 for determining the ear length. Here, it can be seen that the width of the ear (y axis) is plotted per line of pixels (x axis) pertaining to the ear. Each of the individual relative maxima—or a group of relative maxima lying close together—pertains to a respective spindle step. The number of spindle steps can be recognized simply by counting the relative maxima or the groups of relative maxima. The ear length 502 is determined from the beginning of the pixels of the ear at approx. line 60 and the end of the pixels of the ear at approx. line 1710 by means of the reference card or by knowing the width of an individual pixel or line of pixels.

FIG. 6 shows an illustrative diagram 600 of a cross correlation function for determining the number of spindle steps based on the template matching method. The x axis shows the respective position of the template (pattern from the middle of the ear) relative to a correlation value (similarity value) of the template relative to the entire ear. One can recognize in the center of the diagram—at the pixel value of about 525, cf, 602/max. agreement—a correlation value of practically 1. At this location, the template is exactly at its original location. Based on the distances of the relative maxima of the representation, a period length 604 can be determined that corresponds to the distance of the individual spindle steps from one another. Based on the determined length of the ear and the average determined period length 604, the number of spindle steps can also be calculated by division and rounding off.

Figure 7:
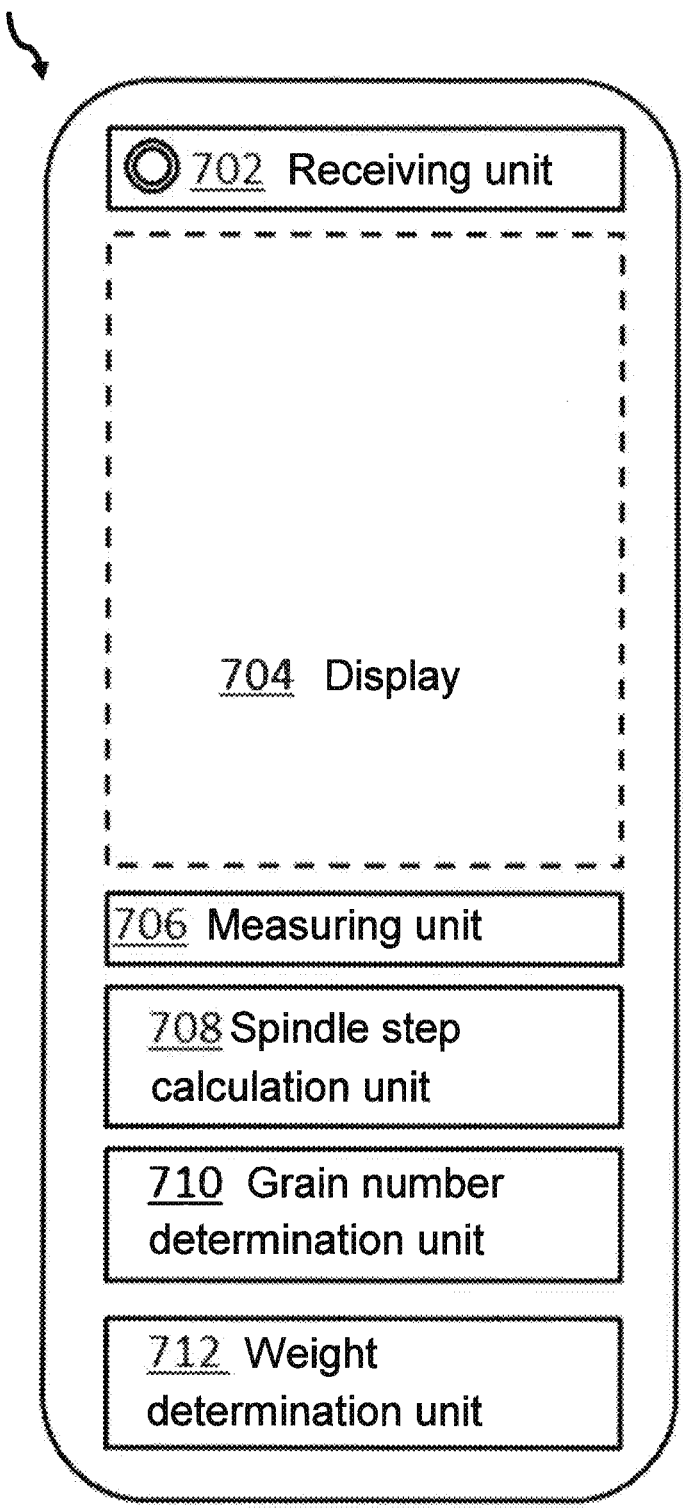
FIG. 7 shows a block diagram of a system for determining the total number of grains of an ear of a grain stalk.

FIG. 7 shows a block diagram of a system for determining the total number of grains of an ear of a grain stalk. The system comprises a receiving unit 702 for receiving a digital image of the ear in a spindle step view of the ear. If the system for determining the total number of grains is integrated into a mobile device, the receiving unit is then a digital camera. In another embodiment, a digital image of the ear is captured by a digital camera and transmitted to the receiving unit 702—optionally wirelessly. The ear in the digital image is recorded in front of a reference card as a background. Optionally, the system can comprise a display unit 704. Moreover, the system has a measuring unit 706, It is adapted for determining a length of the ear along the longitudinal axis of the ear by separating image pixels of the digital image of the ear front the background. Moreover, the measuring unit 706 is adapted for comparing pixel coordinates at one end of the ear with pixel coordinates of the ear at an opposite end of the ear in a longitudinal direction of the ear by means of image marks on the reference card.

Additionally, the system comprises a spindle step calculation unit 708 that is adapted for determining a number of spindle steps of the ear by means of a template matching method, and a grain number determination unit 710 that is adapted for determining a number of grains of the ear by multiplying the determined number of spindle steps by a factor.

Finally, a weight determination unit 712 is also provided in the system that is adapted for determining the weight of all of the grains of the ear by multiplying the determined number of grains by a calibration factor.

As mentioned above, the system can be part of a server system that receives the digital image(s) from a digital camera—for example a smartphone. On the other hand, it is also possible—if corresponding computing power is available—to integrate the entire system into the mobile system, for example into a smartphone or a digital camera.

Figure 8:
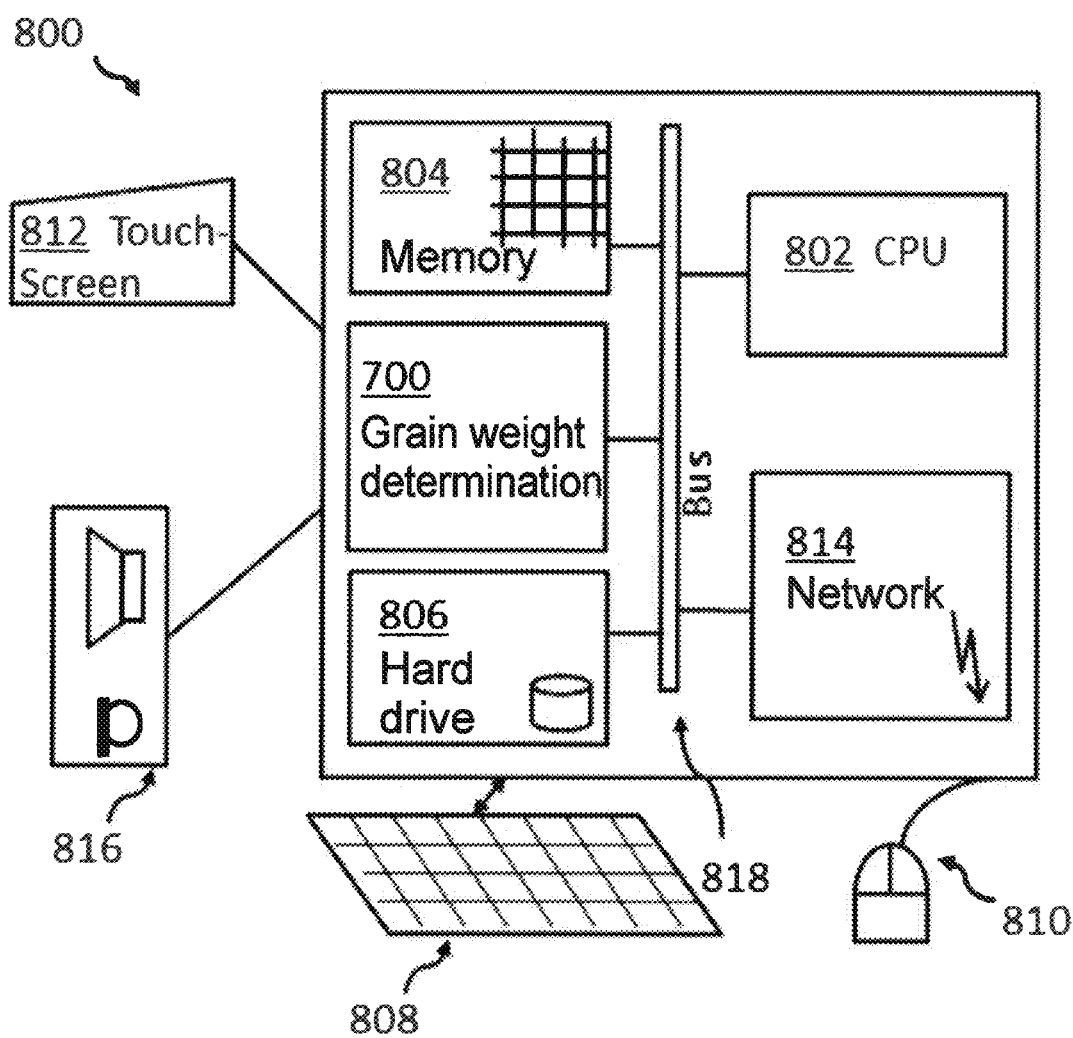
FIG. 8 shows a block diagram of an example of a computer system together with the system according to FIG. 7.

Embodiments of the invention can be implemented together with virtually every type of computer—in particular also with a smartphone—independently of the platform used for storing and executing the program code. FIG. 8 shows an example of a computer system 800 that is suitable for implementation of program code relating to the proposed method.

The computer system 800 is only an example of a suitable computer system, and it is not intended to represent a limitation of the scope of use or functionality of the invention described herein. On the contrary: the computer system 800 is suitable for implementing any feature or any functionality of the examples described here. The computer system 800 contains components that can work together with numerous other general or dedicated computer system environments and/or configurations.

Examples of known computer systems, environments and/or configurations that can be suitable for working with the computer system 800 include, without being limited to, tablet computers, notebook computers and/or other mobile computing systems and/or smartphones, multiprocessor systems, microprocessor-based systems, programmable consumer electronics or also digital cameras or PDAs (personal digital assistants).

The computer system 800 is described here in a general context of instructions that can be executed by a computer system. In this case, it can also be program modules that are executed by the computer system 800. Program modules generally comprise program routines, partial programs, objects, components, processing and/or decision logic, data structures, etc., that carry out a specified object or represent a specified abstract data type.

As mentioned above, the computer system 800 can be implemented in the form of a "general purpose" computing system. The components of the computer system 800—without being limited hereto—comprise one or a plurality of processing units 802 (CPUs), a memory system 804 and a system bus 818 that connect different system components—including the main memory 804 with the processor 802.

The computer system 800 also comprises various computer-readable media. Such media comprise all media that are accessible by the computer system 800. This includes both volatile and non-volatile media, which can be either removable or integrally installed.

The main memory 804 can also comprise computer-readable media in the form of a volatile memory. This can for example be a random access memory (RAM) or a cache memory. The computer system 800 can further comprise removable and non-removable storage media. The storage system 812 can for example be capable of storing data on a non-removable memory chip. The storage media can be connected to the system bus 806 by one or a plurality of data interfaces. As described in further detail below, the memory 804 can comprise at least one computer program product including a plurality of program modules at least one) that are configured or can configure the computer system such that the functions of the embodiments of the invention can be executed.

A program that comprises a plurality of program modules can be stored for example in the memory 804, as can an operating system, one or a plurality of application programs, program modules and/or program data.

The computer system 800 can further communicate with a plurality of external devices such as a keyboard 808, a pointer instrument ("mouse") 810, a display (not shown), etc. These devices can for example be combined in a touch-sensitive screen 812 (touch screen) in order to allow intuitive interaction with the computer system 800, The computer system 800 can also comprise acoustic input/output devices 816, Moreover, further connections may also be present in order to allow communication with one or a plurality of other data processing devices (modem, network connections, etc.). Moreover, such communication can take place via input/output (I/O) interfaces. Furthermore, the computer system 800 can communicate via one or a plurality of networks-such as a LAN (local area network), a WAN (wide area network) and/or a public (mobile) network (e.g. the Internet) via the adaptor 814. As shown, the network adapter 814 can communicate with other components of the computer system 800 via the system bus 818. Moreover, it should be noted although this is not shown that other hardware and/or software components can be used in connection with the computer system 800. These include e.g. micro code, device drivers, redundant processing units, etc.

Moreover, the system 700 for determining a weight of all of the grains of an ear of a grain stalk can be connected to the bus system 818. In this manner, the computer system or the system 700 for determining a weight of all of the grains of an ear can receive the digital image, carry out determination of the weight and send the result back to the mobile device. In a particular embodiment, the system 700 can also be integrated into a mobile computer system (e.g. a high-performance smartphone).

The description of the various embodiments of the present invention is provided for illustrative purposes. These embodiments are not intended to limit the scope of the inventive concept. Further modifications and variations are available to the person having ordinary skill in the art without constituting deviations from the core of the present invention.

The present invention can be implemented as a system, a method and/or a computer program product or a combination thereof. The computer program product can comprise a computer-readable storage medium (or simply a "medium") that contains computer-readable program instructions in order to cause a processor to implement aspects of the present invention.

This medium can be based on electronic, magnetic or electromagnetic waves, infrared light or semiconductor systems that are also suitable for transmission. This includes solid-state memory, random access memory (RAM) and read-only memory (ROM). The computer-readable program instructions described here can be downloaded onto the corresponding computer system by a potential service provider via a mobile network connection or a stationary network.

The computer-readable program instructions for implementing operations of the present invention can comprise any kind of machine-dependent or machine-independent instructions, micro code, firmware, status setting data, source code or object code written in any desired combination of one or a plurality of programming languages. The programming languages can be C++, Java or similar modern programming languages or conventional procedural programming languages such as the "C" programming language or similar programming languages. The computer-readable program instructions can be completely executed on the computer system. In other embodiments, electronic circuits such as e.g. programmable logic components, field-programmable gate arrays (PGAs) or programmable logic arrays (PLAs) can execute the instructions using status information in the computer-readable program instructions to individualize the electronic circuit(s) in order to carry out aspects of the present invention.

Aspects of the present inventions are presented in this document by means of flow diagrams and/or block diagrams of methods, apparatuses (systems) and computer program products corresponding to the embodiments of the invention. It is understood that each block of the flow diagrams and/or block diagrams and combinations of blocks in the flow diagrams and or block diagrams shown can be implemented by computer-readable program instructions.

These computer-readable program instructions can be provided to a processor of a "general purpose computer" or special computer hardware or other programmable data processing devices in order to produce a machine such that the instructions executed by the respective processor generate means for implementing the functions/actions shown in the corresponding flow diagram and/or block diagram or blocks thereof. These computer-readable program instructions can also be stored on a computer-readable storage medium such that they cause a computer or a programmable data processing device to execute the instructions stored on the medium by means of the respective processor, so that aspects or actions of the method described in this document are carried out.

The invention claimed is:

1. A method for determining a weight of all of the grains of an ear of a grain stalk, wherein the method comprises the following steps:
   providing a digital image of the ear in a spindle step view of the ear, wherein the ear, in capturing of the digital image, is located in front of a reference card as a background,
   determining a length of the ear along the longitudinal axis of the ear by separating image pixels of the digital image of the ear from the background and comparing pixel coordinates at one end of the ear with pixel coordinates of the ear at an opposite end of the ear in a longitudinal direction of the ear by means of image marks on the reference card,
   determining a number of spindle steps of the ear by means of a template matching method,
   determining a number of grains of the ear by multiplying the determined number of spindle steps by a factor, and
   determining the weight of all of the grains of the ear by multiplying the determined number of grains by a calibration factor.

2. The method according to claim 1, wherein the method also comprises determining a 1000 grain weight of the grains of the ear.

3. The method according to claim 1, wherein the template matching method comprises
   pixelwise displacement of an image template comprising a selected average partial area of the ear over the entire ear in a longitudinal direction of the ear and respective determination of a similarity factor of the image template with a respective covered ear section, thus giving rise to relative maxima in an x-y representation, wherein the x value represents the displacement of the image template and the y value represents the similarity factor, and
   determining the number of spindles from the x-y representation.

4. The method according to claim 3, wherein determining the number of spindles from the x-y representation comprises
   determining an average period length based on the distances of the relative maxima from one another, and
   determining the number of spindles by dividing the ear length by the period length.

5. The method according to claim 3, wherein determining the number of spindles from the x-y representation comprises
   determining the number of relative maxima.

6. The method according to claim 1, wherein the method for determining the length of the ear comprises
   transforming the position of the pixels of the ear relative to the reference card, so that oblique perspectives of the digital image of the ear are compensated for and so that the longitudinal axis of the ear lies parallel to one side of the reference card.

7. The method according to claim 1, wherein the method for determining the length of the ear comprises transforming the pixels of the ear relative to the reference card according to the upright placement of the ear so that the longitudinal axis of the ear lies parallel to the side of the reference card.

8. The method according to claim 1, wherein a development stage of the ear is greater than or equal to 60 according to the Biologische Bundesanstalt, Bundessortenamt and Chemische Industrie (BBCH).

9. The method according to claim 1, wherein a color value of the reference card is in sharp contrast to an average color value of the ear in a color model.

10. The method according to claim 1, wherein a color value of the reference card is in sharp contrast to an average color value of the ear in a RGB color model.

11. The method according to claim 1, wherein the spindle step view is that view of the ear that offers the smallest view area when a longitudinal axis of the ear runs in the view area.

12. The method according to claim 1, wherein capturing of the digital image of the ear is carried out on the stalk of the ear or separately from the stalk.

13. The method according to claim 1, wherein the image marks have at least two image markers and/or wherein the image marks have at least one scale.

14. The method according to claim 1, wherein the calibration factor comprises at least one dependency with respect to one of the factors selected from the group composed of type, growth stage, weather, geographic location and fertilization status.

15. A system for determining a weight of all of the grains of an ear of a grain stalk, wherein the system comprises a receiving unit for receiving a digital image of the ear in a spindle step view of the ear, wherein the ear in the digital image is located in front of a reference card as a background, a measuring unit that is adapted for determining a length of the ear along the longitudinal axis of the ear by separating image pixels of the digital image of the ear from the background and comparing pixel coordinates at one end of the ear with pixel coordinates of the ear at an opposite end of the ear in a longitudinal direction of the ear by means of image marks on the reference card, a spindle step calculation unit that is adapted for determining a number of spindle steps of the ear by means of a template matching method, a grain number determination unit that is adapted for determining a number of grains of the ear by multiplying the determined number of spindle steps by a factor, and a weight determination unit that is adapted for determining the weight of all of the grains of the ear by multiplying the determined number of grains by a calibration factor.

16. A non-transitory computer-readable storage medium on which a computer program product comprising program elements for determining a weight of all of the grains of an ear of a grain stalk is stored which, when executed by a processor, causes the processor to carry out the method according to claim 1.

* * * * *